Feb. 21, 1967  J. R. STEVENSON  3,304,781
POSITIVE DISPLACEMENT METER
Filed Nov. 4, 1963  3 Sheets-Sheet 1

INVENTOR
JAMES R. STEVENSON

BY *Strauch, Nolan & Neale*

ATTORNEYS

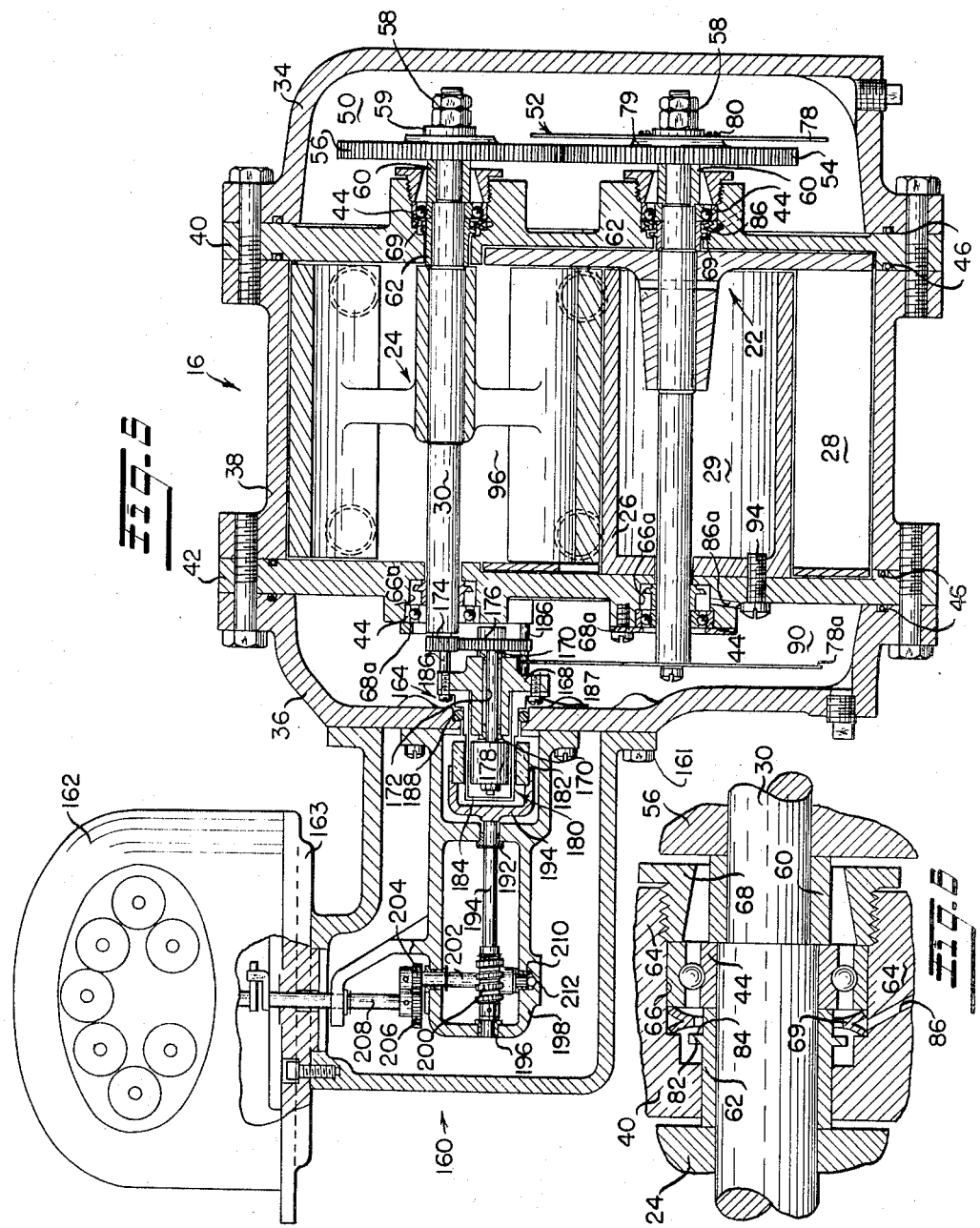

INVENTOR
JAMES R. STEVENSON

United States Patent Office 3,304,781
Patented Feb. 21, 1967

3,304,781
POSITIVE DISPLACEMENT METER
James R. Stevenson, Du Bois, Pa., assignor to Rockwell Manufacturing Company, Pittsburgh, Pa., a corporation of Pennsylvania
Filed Nov. 4, 1963, Ser. No. 321,056
7 Claims. (Cl. 73—253)

The present invention is an improvement over co-pending application Serial No. 323,191, now U.S. Patent No. 3,255,630, entitled "Meter" filed on even date herewith and relates to rotary positive displacement gas metering apparatus and more particularly to such apparatus having novel rotating component parts.

Up to the present, lobe-type gas meters are the only type of rotary positive displacement mechanism widely used in gas flow measurement. A lobe-type meter consists of two figure-eight shaped rotors or lobes mounted on separate spaced apart shafts and kept in the proper angular relationship by means of timing gears, i.e., 90 degrees out of phase with respect to each other during rotation. Gas is trapped and displaced through the meter between the neck portions of each figure-eight shaped rotor and the meter housing as differential gas pressure turns the rotors seriatim. Consequently, the discharge is periodically pulsating in nature. The amount of gas so entrapped and displaced through the meter is of measurable volume and in theory each revolution of the rotors discharges a known volume of gas from the meter.

While the lobe-type meter has gained wide commercial acceptance, it has inherent within its construction several maleficent features:

First, accurate timing is extremely critical to maintain a close line seal or running clearance between the rotors. This is necessary to prevent leakage, and also to prevent the rotors from striking each other during rotation. This critical timing requirement of the lobe-type meter demands the use of expensive precision gears of fine pitch which are in turn more susceptible to jamming due to the presence of foreign particles. The critical timing and the necessary small running clearance or line seal prohibits the lobe-type meter from being readily disassembled and reassembled by the user without upsetting the meter calibration and affecting its performance.

Second, the characteristic cyclic variation in delivery or discharge, inseparable from lobe design, causes corresponding large undesirable pressure pulsations, especially when used in reasonably close forward proximity to mechanism requiring a gas supply under uniform pressure for purposes of optimum performance and safety. This characteristic cyclic variation in delivery is responsible for not only a pronounced fluctuation in the accuracy of measurement, but also for detrimental head loss over the entire operating flow range. The cyclic variations also produce shaft vibrations causing erratic flow measurements at certain critical shaft speeds which may deviate as much as several percent from correct values. These shaft vibrations are harmonically sinuous in nature and become almost destructive in character at maintained critical shaft speeds.

Third, alternating or seriatim driving of first one rotor and then the next creates a pulsating oppositely directed torque load resulting in a periodic timing gear back lash phenomenon. This effect coupled with the already noted variations in delivery produce a cyclic impact load on the timing gears which will inevitably after prolonged use result in uneven wear on the gear teeth. Maintenance costs are high since the meter performance is adversely affected as wear of the gear teeth becomes appreciable.

While some attempts have been made to design a practicable vane type positive displacement rotary meter, such attempts have failed to achieve a performance level sufficient for commercial acceptance. Hence, at present the lobe-type meter with its manifest deficiencies, remains the only positive displacement rotary meter widely used in gas flow measurement.

Accordingly, it is a primary object of the present invention to overcome the above-mentioned lobe-type meter deficiencies and to improve upon co-pending application Serial No. 323,191 entitled "Meter" filed on even date herewith by providing a novel positive displacement rotary gas meter apparatus having the following novel features:

(1) A unique system for driving flow measuring instrumentation by means of the rotary abutment shaft, preferably through a magnetic drive whereby gear back lash is minimized;

(2) Novel biasing structure for maintaining the appropriate moving parts within the meter apparatus in spaced relation within required tolerances to prevent unmetered fluid leakage independent of the amount of wear of the parts; and (3) An easily manufactured novelly shaped rotor hub having improved structural integrity.

Other objects and novel features will become apparent by reference to the appended claims and as the description proceeds in connection with the accompanying drawings wherein:

FIGURE 5 is an end elevational view partly broken away in cross section illustrating the novel interrelationship between the rotor and rotary abutment assemblies, and the flow measuring register or instrument which is driven by the rotary abutment shaft;

FIGURE 6 is a cross sectional view illustrating the novel oil-seal bushing and biasing structure of the present invention in its shaft-carried assembled position;

*General description*

Figure 1:
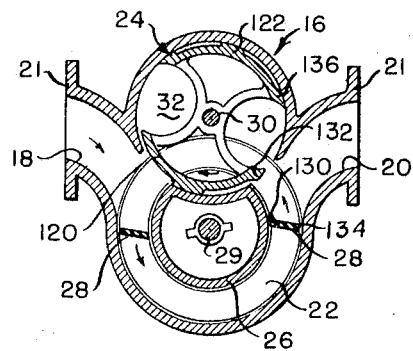
FIGURES 1 through 4 are cross sectional views through the preferred embodiment of the instant invention illustrating four sequential operational positions of the rotor vanes as they spacedly mate with the rotary abutment during rotation.

Referring now to the drawings wherein like parts are referred to with like numerals throughout the figures, FIGURES 1 through 4 broadly illustrate sequential operational positions, each at approximately 45° greater angular displacement, of the preferred embodiment of the present inventive meter. In general it includes body 16 having influent opening 18 and effluent opening 20. These openings each have a flange 21 adapted to be secured in a fluid conveying line. Intermediate influent 18 and effluent 20, within body 16, are rotor 22 and rotary abutment 24 which rotate in opposite directions. Within rotor 22 and adjacent rotary abutment 24 is body-mounted stationary abutment 26. Fluid entering influent opening 18 impinges upon non-radial vanes 28 to rotate rotor 22 in a counter-clockwise direction about shaft 29 (as viewed in FIGURES 1-4). In this way vanes 28, during rotation, divide off a measurable quantity of fluid at the influent, carry it between the meter housing and stationary abutment 26 and discharge it at the effluent. Meshing timing gears attached to the ends of rotor and rotary abutment shafts 29 and 30 cause clockwise rotation of rotary abutment 24 responsive to counter-clockwise rotation of rotor 22. The rotation of rotor 22 and rotary abutment 24 is synchronized to permit vanes 28 to be spacedly received in arcuate spaces 32 and thereby prevent contact therebetween.

The rotation of rotary abutment shaft 30 drives, through separate means, instrument of conventional construction which accurately records the measured volume of fluid passing through the meter. The entire meter may be disassembled and reassembled for purposes of maintenance of inspection without interference with the meter calibration.

*Detailed description of a preferred embodiment*

As best seen in FIGURE 5, end bells 34 and 36 are bolted to but separated from main body casing 38 by side plates 40 and 42, respectively, which carry main bearings 44 for journalling shafts 29 and 30. The flanges of end bells 34 and 36 and side plates 40 and 42 are sealed against lubrication and fluid leakage by O rings 46. External of said plate 40 and enclosed by end bell 34 are lubrication chamber 50 and timing gear assembly 52.

Timing gear assembly 52 includes non-precise coarse pitch driving timing gear 54 and meshing driven timing gear 56 carried on the ends of shafts 29 and 30, respectively. These timing gears are sandwiched between spacers 59 and 60 which are biased in position from one side by shaft-mounted lock nut assemblies 58.

As illustrated in FIGURE 6, spacers 60 also bear against the inner race of main bearings 44 located in bosses 64 of side plate 40, and are non-rotatably carried on shafts 29 and 30, respectively. The inner race of each bearing 44 also bears against one end of shaft-mounted bushing 62 and the outer race of each bearing 44 is adjustably held in open groove 66 between retainer gland 68, threadedly engaged in boss 64, and bifurcated belleville spring 69.

The clearances between each end of the measuring rotor vanes 28, each end of rotary abutment 24 and plates 40 and 42 are adjusted to prevent unmetered fluid leakage by means of belleville springs 69 which bear against the vertical edge of open grooves 66 and the outer race of bearings 44. This entire assembly is held in movable position by retainer glands 68. Glands 68 have a generous clearance from spacer 60 and are sloped along their inner diameter to allow oil to gravity lubricate bearings 44. The outer diameter of glands 68 are threaded into recesses 66 and the amount of axial movement of shafts 29 and 30 and of rotor 22 and rotary abutment 24 is determined by the relative amount of tightness or looseness of glands 68. The belleville springs 69 hold the entire assembly under predetermined compression and provides for accurate positioning of rotor 22 and rotary abutment 24 even after the meter parts have been subjected to prolonged wear.

Lubrication chamber 50 also houses a supply of appropriate lubricating oil which is distributed to the moving parts therein by the splashing centrifugal action of disc-shaped oil slinger 78 (FIGURE 5). Oil slinger 78 is spaced away from gear 54 by spacer 79 and is secured thereto by mounting screws 80 so as to be concentric of shaft 29 and operatable to distribute the oil irrespective of whether the meter is in a horizontal or vertical attitude. The oil so distributed is prevented from escaping from chamber 50 through the central opening in bosses 64 by oil-seal bushings 62 while at the same time a small amount of the fluid being metered is permitted to enter chamber 50 through shaft clearances in bosses 64 and bearings 44 to equalize the pressure on each side of plates 40 and 42. To lubricate the moving parts in chamber 50 oil passes along gears 54 and 56, between spacers 60 and retainer glands 68, through bearings 44 onto the outer periphery of and against annulus 82 of bushings 62 (see FIGURE 6). During rotation the linear speed of outermost surface of annulus 82 is significantly greater than the linear speed of any other surface of bushings 62. The tangential force component of the speed of annulus 82 is of sufficient magnitude to cause excess oil on side 84, which faces chamber 50, to flow outwardly and be thrown against the inside wall of bosses 64 to drain back into chamber 50 through sloped oil return drain holes 86 in side plate 40. In addition to acting as an oil seal, bushings 62, as above stated, function to space rotor 22 and rotary abutment 24 away from side plates 40 and 42 thereby facilitating unobstructed rotation of those moving parts.

With further reference to FIGURE 5, side plate 42 supports the left-hand end of shaft 29, as described in co-pending application Serial No. 323,191, filed on even date herewith. Bearings 44 and bushings 62 are held in position in recesses 66a by bearing retainer 68. Here, however, bushings 62 terminate against plate 42 and do not abut rotor 22 and rotary abutment 24. A second lubrication chamber 90 is equipped with oil slinger 78a which in combination with chamber 90 function as do chamber 50 and oil slinger 78. Oil drain 86a in plate 42 returns oil thrown from bushing 62 during rotation in the manner as drains 86 of plate 40, as explained above.

Stationary abutment 26 (FIGURE 5) is held in fixed position against plate 42, about shaft 29, inside rotor vanes 28 and adjacent rotary abutment 24 by mounting screws 94 for purposes hereinafter explained.

Fluid transmitting chamber 96 is located between influent and effluent openings 18 and 20 and side plates 40 and 42, houses rotor 22, rotary abutment 24 and stationary abutment 26, and is sealed against unmetered fluid leakage by a plurality of area seals described below. Fluid is, however, permitted to enter chambers 50 and 90 through recesses 66 and 66a to equalize the pressure on each side of plates 40 and 42.

Figure 7:
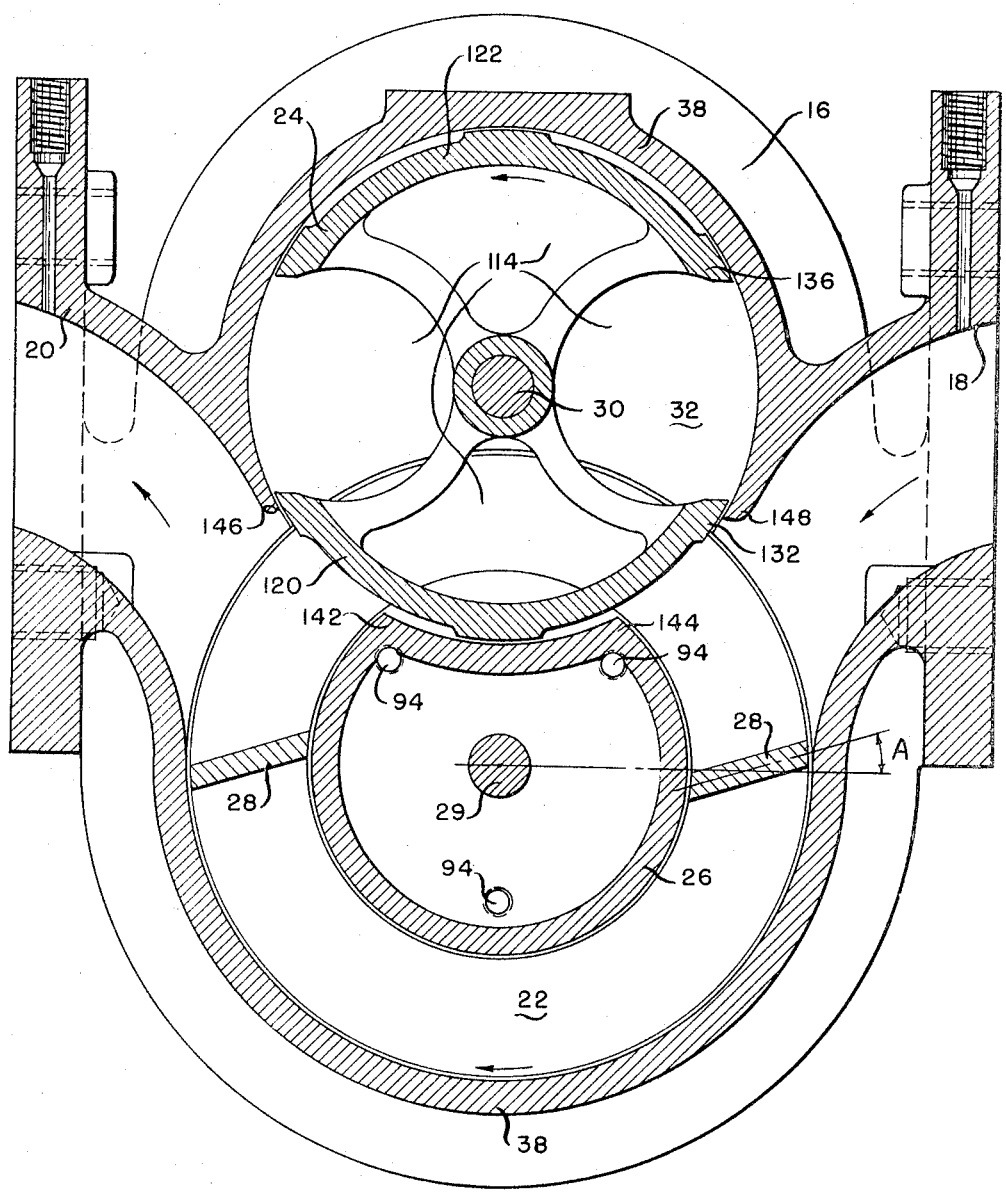
FIGURE 7 is an enlarged cross sectional view similar to those shown in FIGURES 1 through 4.

The highly accurate, steady flow delivery, low head loss operation of the instant positive displacement meter may be better appreciated by reference to FIGURE 7 and the following description. During operation, fluid under pressure enters through opening 18, flows alongside stationary abutment 26 and drivingly impinges on non-radial vanes 28 to turn rotor 22 clockwise and rotary abutment counter-clockwise, and exits through opening 20. The movement of vanes 28, preferably two in number, and rotary abutment 24 is synchronized through timing gears 54 and 56 to spacedly mate vanes 28 with spaces 32.

Figure 8:
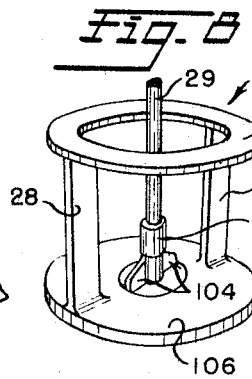
FIGURE 8 is a perspective view illustrating the rotor assembly of the preferred embodiment of the present invention.

Rotor 22, in the preferred embodiment, is independently illustrated in FIGURE 8, and, in addition to shaft 29, comprises four principal integral pieces; hollow shaft-receiving housing 102 which may include stiffeners 104, disc-shaped rotor hub and plate 106, non-radial longitudinal extending planar vanes 28 and annular end plate 108.

It has been empirically determined that head loss through the instant meter may be reduced to nominal magnitudes partly by utilizing a pair of longitudinal extending thin rotor vanes 28 non-radially inclined with respect to shaft 29 to cause the inner edges of the vanes to lead the outer edges in the usual direction of rotation, as indicated by angle A of FIGURE 7.

Figure 2:
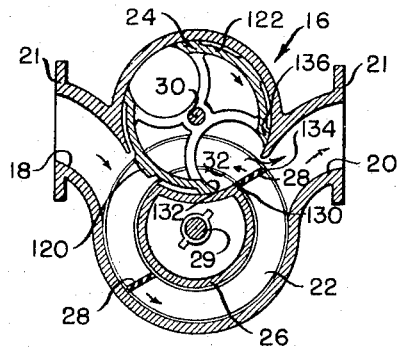
Figure 3:
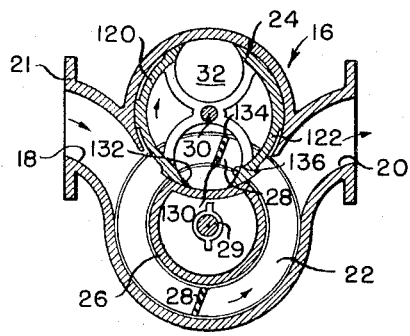
Figure 4:
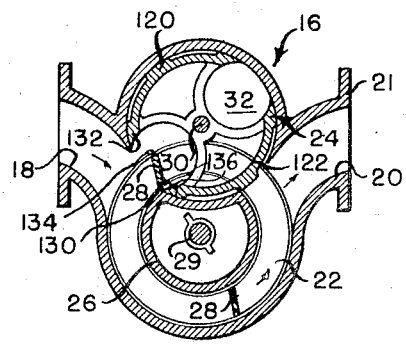

The optimum angle A has been found to be on the order of 16° from the radial when metering gas. Optimum angle A will, however, vary depending on the type of fluid to be metered and the relationship and dimensions of the component parts of the meter, e.g. the size of spaces 32. The slant of vanes 28, as illustrated in FIGURE 2, provides for a more gradual entry of the vanes into space 32 of rotary abutment 24 so that there is a lack of performance influencing head loss consequential of the impact of the vanes against the fluid.

By minimizing the thickness of vanes 28, head loss through the meter is further reduced, but the reduction in thickness is limited by needed flexural rigidity as well as that dimension required to provide effective area edge seals between vanes 28 and main casing 38, and vanes 28 and stationary abutment 26 to prevent leakage of unmetered fluid through the meter. The thickness of vanes 28 may be on the order of 0.2 of an inch for a meter having a rated capacity in the range of 3,000 cubic feet per hour for a fluid of approximately 0.6 specific gravity. To prevent undue and possibly damaging flexure to thin vanes 28, with resulting unmetered fluid leakage, rigidifying annular end plate 108 is integrally attached to the end of vanes 28 opposite plate 106.

Figure 9:
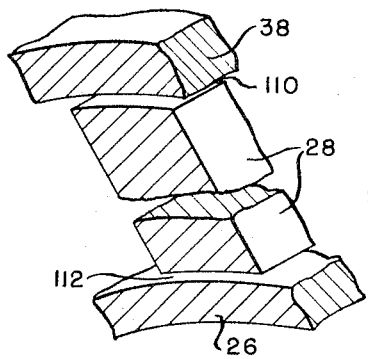
FIGURE 9 is a cross sectional view in perspective illustrating the area seal phenomenon achieved by co-action of the rotor vanes and the adjacent meter body and stationary abutment.

The edges of vanes 28 provide area seals 110 and 112, as opposed to line seals provided by the rotors of the lobe-type meter, as illustrated in FIGURE 9. The edges of vanes 28 are machined to match main casing 38 and stationary abutment 26 and exhibit a surprisingly high re-resistance to fluid flow which effectively prohibits unmetered fluid leakage therealong, even where the running clearances are as much as approximately three times the minimum lobe-type meter clearances. By using area seals, the running clearances of the instant meter may be on the order of 0.006" or more depending upon the meter size.

Rotary abutment 24 is accommodated in an arcuate recess in main casing 38, and is constructed to further lessen the fluid impact of vanes 28 upon entry by providing a single open rotary abutment chamber 114 which facilitates ease of fluid displacement and reduces pressure changes in the chamber and head loss of the meter.

Figure 10:
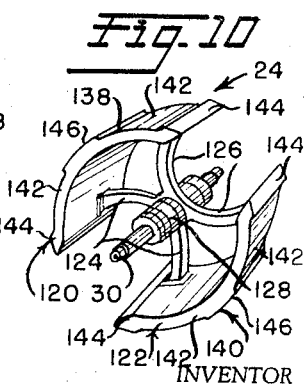
FIGURE 10 illustrates in perspective the preferred rotary abutment of the present invention.

Rotary abutment 24 is preferably of integral construction, as illustrated in FIGURE 10, and consists of two arcuate shells, 120 and 122, connected at their central portions by a pair of interconnected bifurcated ribs 124 and 126 which may be of any desired cross sectional shape, all of which is non-rotatably carried on shaft 30 by hub structure 128. This construction creates a large single volume chamber 114 which also aids in minimizing compression and expansion of compressible fluids when vanes 28 move in and out of this volume during rotation, with resultant lowered head loss, less pressure pulsation and less meter noise. Thus, the instant meter runs relatively smoothly at all operating speeds and provides essentially uniformly high accuracy of measurement throughout the entire flow range.

There is no contact between the rotary abutment and the rotor, the correct angular relationship between these two parts being maintained by timing gears. The timing, however, need not be accurate. As long as the timing is not excessively out of phase so as to cause the vanes to hit the tips of the edges of the rotary abutment shells, the meter performance will remain unaffected. That is to say, forward edge 130 (FIGURE 1) of vane 28 must clear edge 132 of shell 120 and trailing edge 134 of vane 28 (FIGURE 2) must miss edge 136 of shell 122.

Referring again to FIGURE 10, faces 138 and 140 of rotary abutment shells 120 and 122 are recessed at 142 to provide two edge ridges 144 and one central ridge 146 on each shell. This structure serves to provide area seals with main casing 38 and stationary abutment 26, to reduce fluid drag friction and to make the meter generally self-cleaning even when dirty fluids, such as oil well gas, is being metered by transferring the dirt and foreign particles from the meter influent to the meter effluent by means of recesses 142.

Ridges 144 and 146 co-act with main casing 38 and stationary abutment 26 to form at least one area seal at each location during all operative positions as shown in FIGURE 7. The chord between edges 132 and 136 is greater than the chords between: (1) tips 142 and 144 of stationary abutment 26; (2) tip 142 of stationary abutment 26 and edge 146 of main casing 38, and (3) tip 144 of stationary abutment 26 and edge 148 of main casing 38. By this construction chamber 114 intermediate shells 120 and 122 is never simultaneously open to both the influent and effluent openings of the meter and hence unmetered fluid leakage through the rotary abutment is obviated.

In addition to main casing 38, body 16 includes gear box housing 160 (FIGURE 5) which is secured to end bell 36 by cap screws 161 and houses the mechanisms which drive flow registering instrument 162 responsive to the rotation of shaft 30. Instrument 162 may be any standard meter instrumentation positioned upon index plate 163 in any one of several positions, including horizontal or vertical orientation. By driving insturment 162 through rotary abutment shaft 30 rather than through rotor shaft 29 a substantially constant load on timing gears 54 and 56 is maintained during operation. This minimizes the production of back lash and reduces and evens wear between gears 54 and 56 thereby adding to the life expectancy of the instant novel meter.

At the junction between end bell 36 and housing 160 is magnet and bracket assembly 164 screw-mounted to plate 42. Assembly 164 includes bearing plate 168 supported by oilite bearings 170 on shaft 172. Shaft 172 rotates responsive to shaft 30 by means of reduction gears 174 and 176 and thereby turns nut secured driving magnet 178 of magnetic drive assembly 180, which is used to obviate the need for a conventional stuffing box. Magnetic drive assembly 180 includes, in addition to driving magnet 178, driven magnet 182 and magnet well 184. Magnet well 184 and bearing plate 168 are contiguously secured together at their outwardly extending flanges by screws 186 and 187. Screws 186 are threaded into plate 42. O ring 188 tightly fits between magnet well 184 and aperture 190 of end bell 36 and prevents fluid in chamber 90 from infiltrating into gear box housing 160. Hence a static seal is provided between chamber 90 and gear box housing 160.

Bearing 192 rotatably carries shaft 194 to which magnet holder 144 is pin connected. Holder 144 is press-fitted over driven magnet 182. The left-hand end of shaft 144, as viewed in FIGURE 5, seats in bearing 196, which is supported in housing 198, and carries worm gear 200, which drives a gear wheel (not shown) on instrument shaft 202 to actuate register 162 through reduction gears 204 and 206 and shaft 208 in a conventional manner. Shaft 202 is journalled at its lower end in oilite bearing 210 and against thrust bearing 212.

While the meter is operable with flow in either direction, flow is preferably in the direction shown in FIGURES 1-4 and 7 since the rotation so produced is accommodated by conventional registers without requiring modification. Flow in the direction opposite FIGURE 7 would require a left-hand worm drive.

Our invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A positive displacement rotary fluid metering apparatus comprising:
 (a) a body having a lubricant sealed, fluid transmitting chamber and fluid influent and effluent openings communicating with said chamber;
 (b) first and second spaced apart shafts journalled in said body;
 (c) timing gears mounted on said shafts;
 (d) a fluid driven rotor having vanes and being mounted spacedly within said fluid transmitting chamber on said first shaft;
 (e) a rotary abutment mounted spacedly within said fluid transmitting chamber on said second shaft and driven by said rotor through said timing gears, said rotary abutment being shaped to spacedly receive with said vanes during rotation;
(f) stationary abutment means mounted in said body within said rotor and adjacent said rotary abutment to maintain at least two area seals between said influent and effluent openings during all operative positions of said rotor and said rotary abutment; and
(g) adjustment means mounted concentrically about each of said shafts for spacedly maintaining said rotor and said rotary abutment in said fluid transmitting chamber within tolerances sufficient to prevent contact between the moving and stationary parts and to prevent unmetered fluid leakage between said influent and said effluent openings.

2. The apparatus defined in claim 1 wherein said adjustment means on each shaft comprises a part disposed axially between said chamber and the timing gear mounted on the associated shaft, and wherein yieldable means are provided for axially biasing each of said shafts in a first direction, said part limiting axial displacement of its associated shaft under the bias exerted by said yieldable means and being selectively displaceable in said body for axially shifting its associated shaft in a direction opposite to said first direction, said yieldable means and each part thereby cooperating to axially adjust the positions of the assembly of said rotor and said first shaft and the assembly of said rotary abutment and said second shaft.

3. The apparatus defined in claim 2 wherein said yieldable means is a bifurcated belleville washer disposed to bias the timing gear on each of said shafts toward a gear meshing position.

4. A positive displacement fluid metering apparatus comprising:
(a) a body having a fluid transmitting chamber and fluid inlet and outlet openings communicating with said chamber;
(b) first and second spaced apart shafts journalled in said body;
(c) timing gears mounted on said shafts;
(d) a fluid driven rotor mounted on said first shaft in said chamber, said rotor having
  (1) an integral hub consisting of a disc-shaped end plate and an externally tapered hollow shaft-receiving elongated housing of progressively decreasing annular cross section attached to one side of said end plate and extending away from said end plate, and
  (2) a plurality of vanes secured at one end to said hub;
(e) a rotary abutment shaped to spacedly receive with said vanes during rotation, said rotary abutment being mounted on said second shaft in said chamber and driven by said rotor through said timing gears; and
(f) stationary abutment means mounted in said body within said rotor and adjacent said rotary abutment to maintain at least two area seals between said inlet and outlet openings during all operative positions of said fluid driven rotor and said rotary abutment.

5. A positive displacement rotary fluid meter comprising:
(a) a body having fluid inlet and outlet openings, communicating with a fluid transmitting chamber,
(b) a fluid driven rotor member rotatably mounted in said chamber,
(c) a rotary abutment member rotatably mounted in said chamber radially adjacent to said rotor,
(d) gear means drive connecting said rotor member to said rotary abutment member for rotating said abutment member in timed relation with said rotor member,
(e) said abutment member cooperating with said rotor member to divide fluid entering said chamber into measured quantities of predetermined volume,
(f) a spring element mounted in said body for axially biasing each of said members in a predetermined direction, and
(g) selectively displaceable means concentrically surrounding each of the rotational axes of said members and cooperating with the spring element associated with each member for independently adjusting the axial positions of said members in said chamber,
(h) said selectively displaceable means comprising a part mounted in said body for displacement in opposite directions and for limiting axial displacement of its associated member under the bias exerted by said spring element, each of said members being axially shiftable against the bias exerted by said spring element by displacing the part associated therewith in one direction and being axially shiftable under the bias exerted by its spring member by displacing the associated part in the opposite direction.

6. The positive displacement rotary fluid meter defined in claim 5 wherein each of said rotor and rotary abutment members is mounted on a shaft journalled in said body, wherein said gear means comprises a gear mounted on each shaft, and wherein said spring element biases each assembly of said shaft, gear, and associated member in said predetermined direction.

7. The positive displacement rotary fluid meter defined in claim 6 wherein said spring element comprises a bifurcated belleville spring concentrically surrounding each shaft axially between the gear mounted thereon and said fluid transmitting chamber.

References Cited by the Examiner
UNITED STATES PATENTS

| | | | |
|---|---|---|---|
| 73,194 | 1/1868 | Payton | 73—261 |
| 738,836 | 9/1903 | Nothrop | 73—261 |
| 1,641,840 | 9/1927 | Enyart | 73—261 |
| 1,724,873 | 8/1929 | Ford | 73—253 |
| 2,310,078 | 2/1943 | Herman | 103—126 |
| 2,345,975 | 4/1944 | Herman | 103—126 |
| 2,735,371 | 2/1956 | Johnson | 103—125 |
| 2,835,204 | 5/1958 | Richards | 103—125 |

FOREIGN PATENTS

| | | |
|---|---|---|
| 129,730 | 11/1946 | Australia. |
| 579,981 | 7/1959 | Canada. |
| 784,022 | 4/1935 | France. |
| 800,343 | 11/1950 | Germany. |

RICHARD C. QUEISSER, *Primary Examiner.*

E. D. GILHOOLY, *Assistant Examiner.*